June 9, 1959 K. W. RECHENBERG 2,889,641
COMBINATION LAWN MOWER AND SNOW REMOVER
Filed Nov. 1, 1954 2 Sheets-Sheet 1
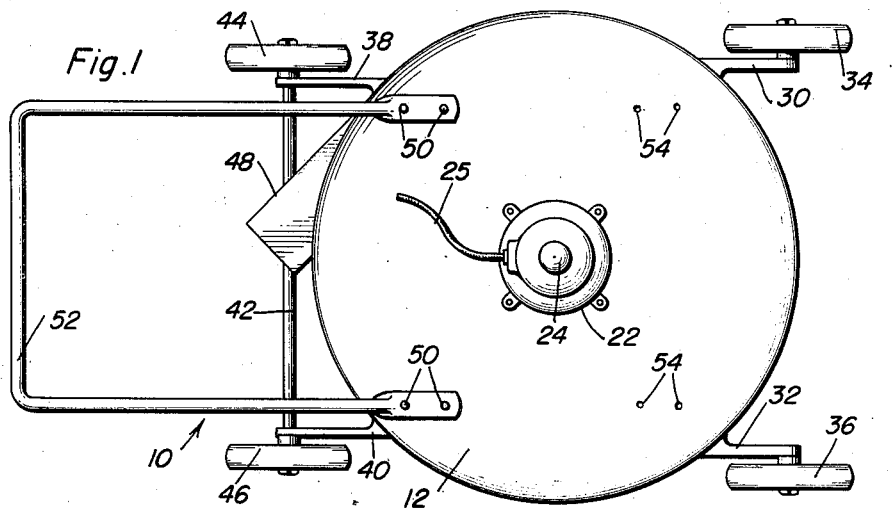
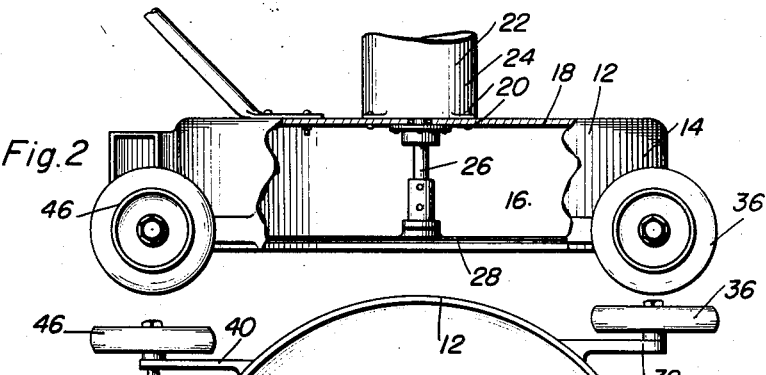
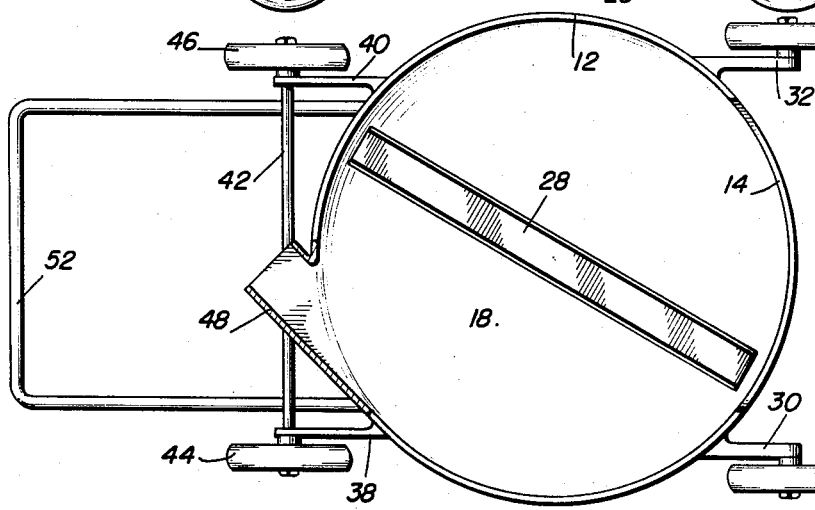
Kurt W. Rechenberg
INVENTOR.

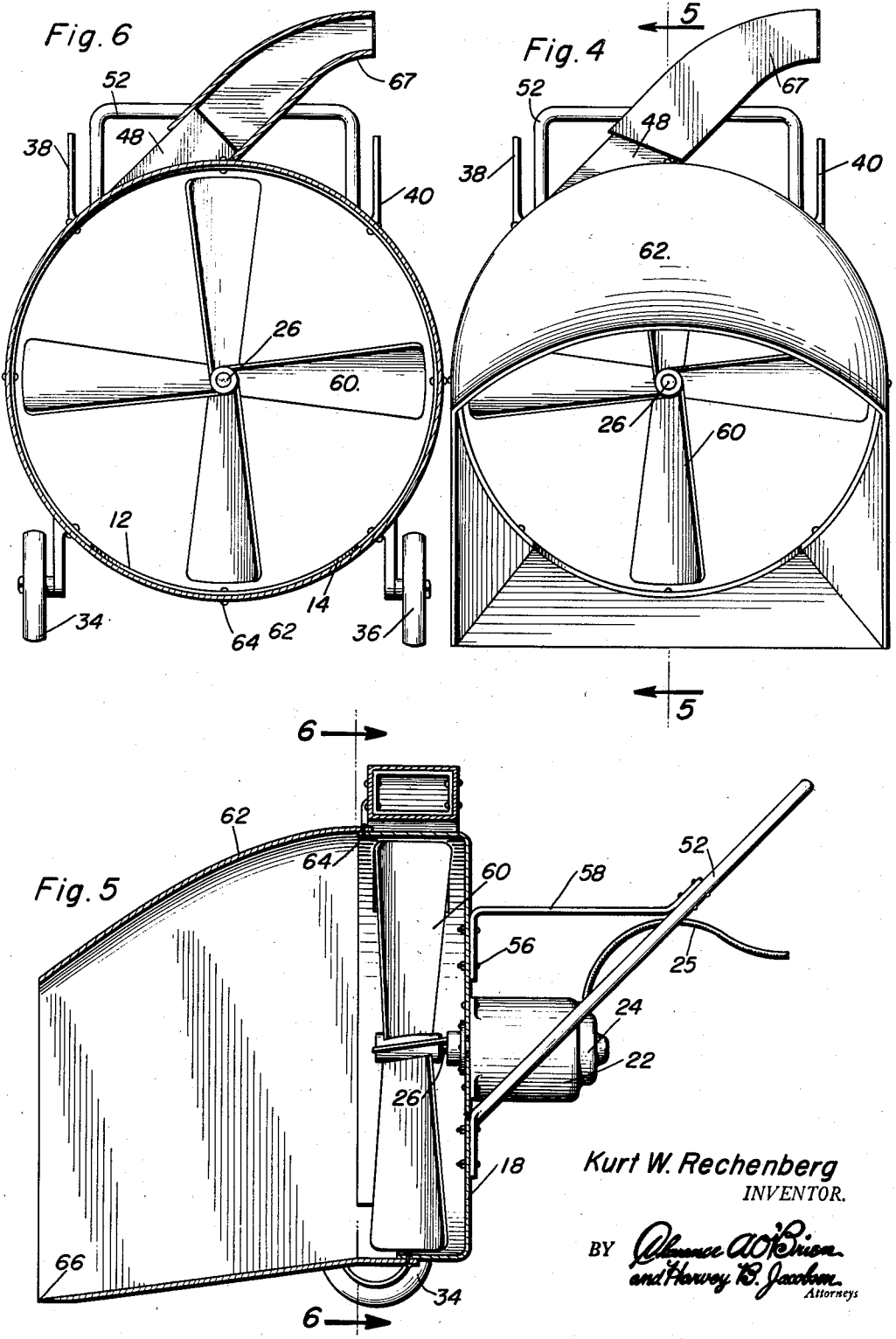

United States Patent Office 2,889,641
Patented June 9, 1959

2,889,641

COMBINATION LAWN MOWER AND SNOW REMOVER

Kurt W. Rechenberg, Columbia Heights, Minn., assignor of forty percent to James Mickle, Osseo, Minn.

Application November 1, 1954, Serial No. 466,148

2 Claims. (Cl. 37—43)

This invention relates to a combination rotary lawn mower and snow remover which has for its primary object the provision of an apparatus which can be readily and easily transformed from a lawn mower to a snow remover.

A further object of the invention resides in the provision of a combination rotary lawn mower and snow remover which is exceedingly easy to operate and which is supported by the same ground engaging wheels whether used as a lawn mower or as a snow remover without requiring adjustment of the wheels with respect to the rest of the apparatus.

Another object of the invention lies in the provision of a handle which may be selectively attached to a housing in a convenient manner so as to enable the device to be easily controlled whether being used as a lawn mower or as a snow remover.

An additional feature of the invention lies in the compact arrangement whereby the motor is directly secured to the housing of the apparatus and in which the handle is directly secured to the same end wall of the housing to which the motor is attached.

Still further objects and features of this invention reside in the provision of a combination lawn mower and snow remover that is strong and durable, simple in manufacture and construction, highly efficient in operation, and which is relatively inexpensive to manufacture, thereby permitting wide distribution and utilization.

These, together with the various ancillary objects and features of the invention which will become apparent as the following description proceeds, are attained by this combination lawn mower and snow remover, a preferred embodiment of which has been illustrated in the accompanying drawings, by way of example only, wherein:

Figure 1 is a plan view of the apparatus comprising the present invention shown arranged for use as a rotary lawn mower;

Figure 2 is a side elevational view of the invention with parts thereof being broken away to show the construction of other parts thereof;

Figure 3 is a bottom plan view of the invention with a part of the chute opening into the casing being shown in section;

Figure 4 is a front elevational view of the invention shown arranged for use as a snow remover;

Figure 5 is a vertical sectional view as taken along the plane of line 5—5 in Figure 4 illustrating the construction of the scoop; and Figure 6 is a vertical sectional view as taken along the plane of line 6—6 in Figure 5 further illustrating the invention as arranged for use as a snow remover.

With continuing reference to the accompanying drawings wherein like reference numerals designate similar parts throughout the various views, and with initial attention directed to Figures 1 through 3, it will be noted that herein the combination lawn mower and snow remover generally designated by reference numeral 10 is shown arranged for use as a lawn mower. This apparatus includes a housing 12 including a cylindrical wall 14 open at the bottom, as at 16, and provided with an end wall 18 closing the top thereof. Bolted or otherwise secured, as by fasteners 20, to the end wall 18 is the casing 22 of a motor 24 such as an electric motor, which is connected by suitable conductors 25 to a source of electrical power, not shown.

The motor 24 is adapted to drive a shaft 26 to which a blade 28 is removably attached, the blade being of the conventional rotary grass cutting construction.

Secured to the casing, as by brackets 30 and 32 attached to the cylindrical wall 14 of the housing 12 are a pair of wheels 34 and 36 which are held downwardly and outwardly with respect to the cylindrical wall 14 of the housing 12. Another pair of brackets 38 and 40 removably support a shaft 42 on which wheels 44 and 46 are mounted.

The cylindrical walls 14 of the housing 12 are provided with an opening, and a chute 48 is either attached to or integrally formed with the cylindrical wall 14 and opens into the interior of the housing 12 so that grass clippings, trash and the like may be directed outwardly of the housing 12 during the operation of the device.

By means of suitable bolts, such as are indicated at 50 in Figure 1, a substantially U-shaped handle 52 is secured to the end wall 18 of the housing 12. This handle slants upwardly and rearwardly and is designed to enable a person to readily move the apparatus along the ground.

The operation of this device as a lawn mower is, of course, based on the rotary action of the blade 28 which sweeps the grass cuttings and trash after cutting out of the chute 48.

Referring now to Figures 1 and 4 through 6, it will be noted that there are provided pairs of bolt holes as at 54 in the end wall 18. These bolt holes are provided for reception of bolts 50 which are used to secure the handle 52 to the forward portion of the cylindrical housing. A brace 58 may also be secured between the handle 52 and the bolt holes at the rear of the cylindrical housing 12. The brace 58 provides extra support for the handle 52 when the housing 12 is in a vertical position. A snow removal blade or screw 60 is then positioned on the shaft 26 in lieu of the blade 28, and after the wheels 44 and 46 and the shaft 42 have been removed, a scoop 62 is affixed as by screws or bolts 64 to the open end of the housing 12 with the scoop 62 tapering convergingly and downwardly and being provided with a blade edge as at 66. It is noted that when this apparatus is arranged for use as a snow remover, as is shown in Figures 4 through 6, the wheels 34 and 36 serve to support the apparatus for movement. A chute extension 67 may be attached to the chute 48 for guiding snow and other matter outwardly beyond the apparatus.

As can be readily observed, the snow remover is operated by pushing the device into the snow which is then driven into the blade 60 and driven by the blade 60 out of the chute 48 and chute extension 67 to be thrown along the side of the path of the apparatus.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A mobile device for use as a rotary lawn mower or snow remover comprising a cylindrical housing having a cylindrical wall, an end wall closing the top of said housing, and an open bottom, a first pair of brackets secured to the cylindrical wall of said housing toward the front of said housing, a second pair of brackets secured to the cylindrical wall of said housing toward the rear of said housing, wheels suspended from said brackets, an opening in said cylindrical wall, a tangential chute carried by said wall adjacent said opening, said chute communicating with the interior of said housing, power source secured to said end wall externally of said housing, a rotatable shaft operatively connected to said power source extending into said housing, a blade carried by said shaft, a first plurality of aligned apertures in said end wall proximate the front of said housing, a second plurality of aligned apertures in said end wall proximate the rear of said housing, a detachable U-shaped handle selectively secured by bolts in either said first or second plurality of aligned apertures to facilitate the mobility of said housing in either a vertical or horizontal position.

2. The combination of claim 1 wherein a downwardly tapered scoop is detachably secured to the housing about the open bottom when the housing is in a vertical position.

References Cited in the file of this patent

UNITED STATES PATENTS

| | | |
|---|---|---|
| 1,566,464 | Caterson | Dec. 22, 1925 |
| 2,675,660 | Barnard | Apr. 20, 1954 |
| 2,675,661 | Titzer | Apr. 20, 1954 |
| 2,695,071 | Hupp | Nov. 23, 1954 |
| 2,708,334 | Coners | May 17, 1955 |